Oct. 21, 1930.    G. W. PENNEY    1,778,834

DEVICE FOR DETECTING OXYGEN IN HYDROGEN

Filed April 30, 1926

WITNESSES:
R. S. Williams
O. B. Buchanan

INVENTOR
Gaylord W. Penney
BY
Wesley G. Carr
ATTORNEY

Patented Oct. 21, 1930

1,778,834

UNITED STATES PATENT OFFICE

GAYLORD W. PENNEY, OF WILKINSBURG, PENNSYLVANIA, ASSIGNOR TO WESTINGHOUSE ELECTRIC & MANUFACTURING COMPANY, A CORPORATION OF PENNSYLVANIA

DEVICE FOR DETECTING OXYGEN IN HYDROGEN

Application filed April 30, 1926. Serial No. 105,761.

My invention relates to devices for detecting oxygen in hydrogen, and it has particular relation to such devices for use in connection with hydrogen-cooling for dynamo-electric machines.

The utilization of hydrogen has obvious advantages as a cooling medium for completely enclosed generators equipped with a closed ventilating system, because, by reason of the small density and great thermal conductivity of hydrogen, less work is required to force a given quantity of cooling fluid through the machine, a smaller quantity of cooling fluid is required, the operating noises of the machines are reduced, and the penetration of the hydrogen into the pores of the insulating coverings of the windings so increases the heat conductivity of the insulation as to materially reduce the temperature of the windings and to permit as much as a 30% increase in the rating of a given machine over that which it would have with air cooling.

If hydrogen is used for cooling a turbo-generator or other electrical machine, there is danger of an explosion if oxygen should become mixed with the hydrogen. Furthermore, any admixture of even a small percentage, by volume, of oxygen or air will greatly increase the density of the cooling medium, and thereby materially reduce its efficiency. It is desirable therefore, to provide some device which will give an alarm if oxygen is mixed with the hydrogen.

My invention is a simple method of, and means for, detecting the presence of oxygen by obtaining an indication of the density of the gaseous cooling medium.

The pressure developed by a fan running at a given speed in a gaseous medium is directly proportional to the density of the gas. A fan running in air develops fourteen times the pressure developed by the same fan running in hydrogen.

In a turbo-generator, the pressure developed by the fan is normally very nearly constant. Therefore, if a device is connected to operate a relay or signalling device, in case the pressure developed by the fan becomes too high, it will be a detector of the presence of other gas mixed with the hydrogen.

Figure 1:
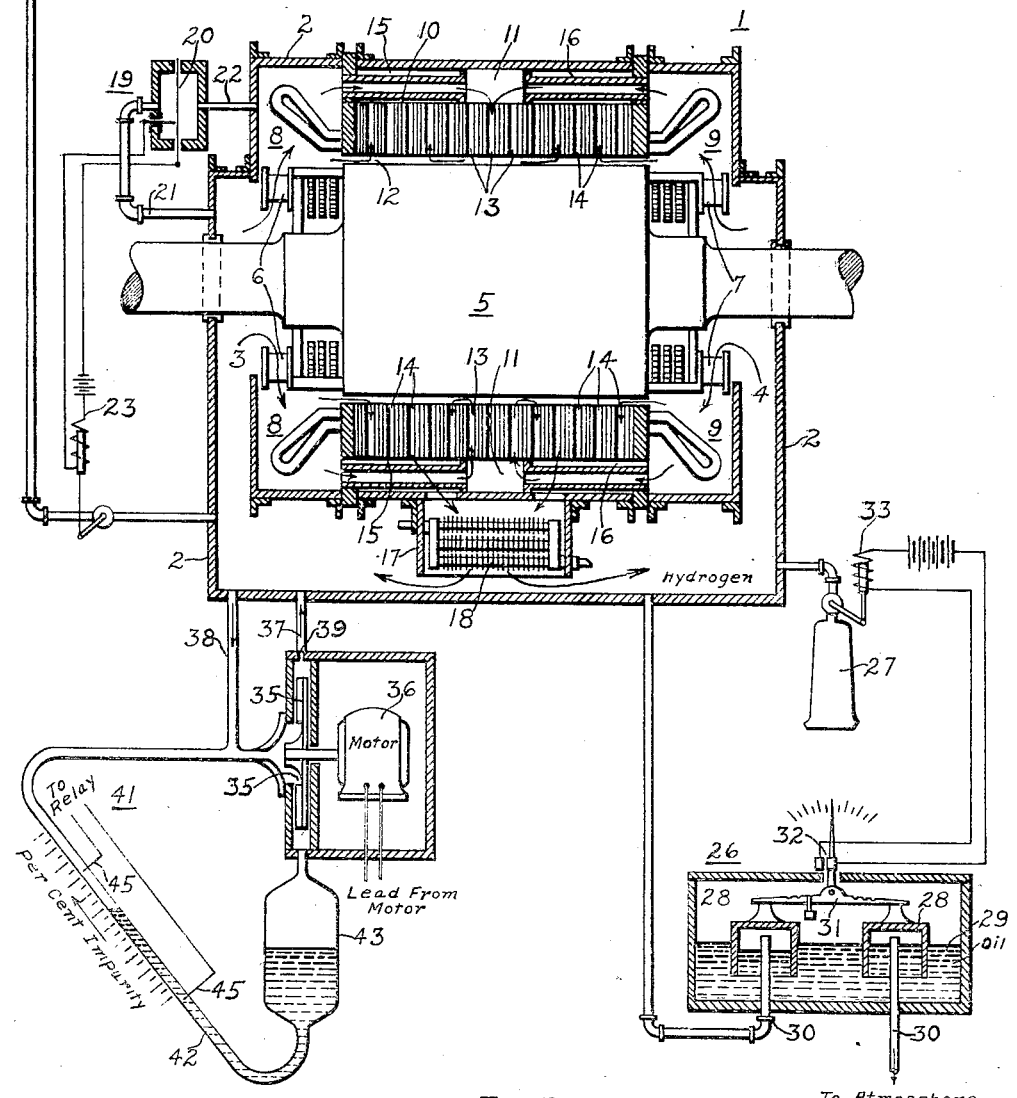
Figure 2:
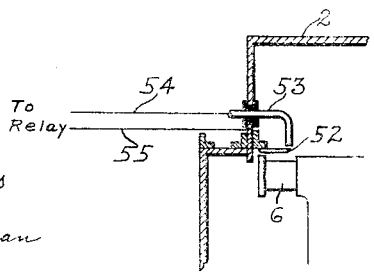

With the foregoing objects in view, my invention consists in the methods and apparatus hereinafter described and claimed, and illustrated in the accompanying drawing, wherein Figure 1 is a longitudinal sectional diagrammatic view showing a turbo-generator embodying my invention, and Fig. 2 is a fragmentary view of a modification.

In the embodiment of my invention illustrated in Fig. 1, I utilize a turbo-generator 1 having an enclosing casing 2, within which is disposed a closed ventilating system of any desired type. In the illustrated embodiment, the closed ventilating system comprises end chambers 3 and 4, at the two ends of the rotor member 5, from which the gaseous cooling medium is drawn by means of fans 6 and 7, whence it is discharged into end bells or chambers 8 and 9 at the two ends of the stator member 10.

A part of the air from the two end bells 8 and 9 is led to an annular intake chamber 11, surrounding the central portion of the stator member 10, and a part of the air from the end bells discharges directly into the ends of the air gap 12. The stator member is provided with radial intake ducts 13, which communicate with the annular intake chamber 11, and radial discharge ducts 14, which communicate with two annular discharge chambers 15 and 16 surrounding the end portions of the stator member. The paths of the air currents are clearly indicated by the arrows in Fig. 1.

The two annular discharge ducts 15 and 16 discharge into a common discharge pipe 17 which communicates with the two chambers 3 and 4 at the ends of the rotor member, whence the ventilating medium is again forced through the machine by the fans. Disposed within the discharge pipe 17 is a cooling device 18, which may comprise pipes carrying water or other cooling medium.

I preferably utilize hydrogen as the cooling medium which is circulated by the closed ventilating system within the machine for reasons hereinbefore indicated.

To obtain an indication of the presence of oxygen, or, in general, any relatively heavy gas, mixed with the hydrogen, I utilize some means for responding to the density of the gaseous cooling medium. In Fig. 1, a differential pressure gauge 19 is shown comprising a diaphragm 20, one side of which is connected to the suction side of the fan by means of a pipe 21, and the other side of which is connected to the pressure side of the fan by means of a pipe 22. Excessive pressure difference deflects the diaphragm and closes a relay or indicator circuit 23, which is shown as comprising an electrically operated valve for permitting the cooling medium to escape to the roof, as indicated in Fig. 1.

In operation, it will be usual to maintain the hydrogen pressure within certain predetermined limits, usually so chosen that the minimum pressure on the suction side of the fan shall not be below atmospheric pressure. I have indicated, in Fig. 1, a gas pressure responsive device 26 and a connection to a hydrogen tank 27, connected to the casing 2 of the machine at a point remote from the pressure side of the fan, whereby the gaseous pressure within the machine may be maintained, as desired.

The gas-pressure responsive device 26 may be of any suitable type. It is shown as comprising a pair of inverted bells 28 floating in an oil bath 29. Pipes 30 extending up from the bottom of the receptacle open into the upper portions of the bells 28, and communicate with the interior of the machine casing 2 and the atmosphere, respectively, whereby a very delicate measurement is obtained. The inverted bells 28 are mounted on a scale beam 31, the pointer of which is provided with electrical contacts 32 for energizing a solenoid 33, or other electro-dynamic device, for opening the valve of the hydrogen tank when the hydrogen pressure in the turbo-generator 1 falls below a predetermined value, which is usually chosen to be slightly higher than atmospheric pressure.

In addition to utilizing a device responsive to the pressure developed by the turbo-generator fan, such as the differential pressure gauge 19 shown in Fig. 1, it is desirable to utilize some means for measuring the purity of the hydrogen before starting up the generator. For this purpose, a small separate fan 35 is shown in Fig. 1, driven by an auxiliary motor 36, the auxiliary apparatus being shown somewhat larger than it really is, for convenience in illustration. The auxiliary device consists of a very small motor 36 driving a correspondingly small fan 35 which circulates hydrogen through pipes 37 and 38 communicating with the interior of the machine casing 2. A small quantity of the gas to be sampled circulates through the auxiliary fan so that the gas in the auxiliary fan is always the same as that in the main generator. The amount of gas which is circulated may be controlled by an orifice 39, as indicated in Fig. 1.

A pressure indicating device 41 is connected across the auxiliary fan to respond to changes in the density of the gas. While the pressure indicating device may assume any one of a number of different forms, I have shown it, for the purpose of illustration, as comprising an inclined glass tube 42 connected, at its lower end, to an upwardly extending portion 43 which is connected to the pressure side of the auxiliary fan 35. The upper end of the inclined tube 42 is connected to the suction side of the auxiliary fan.

The inclined tube 42 is filled with a suitable liquid, and it is preferably provided with electrodes 45 serving as means for closing a relay circuit in case the pressure developed by the auxiliary fan exceeds a predetermined amount, as in the relay circuit 23 controlled by the diaphragm 20. As the hydrogen pressure in the main turbo-generator is maintained at a substantially constant pressure, the inclined tube 42 may be calibrated directly in the percent of air admixture in the hydrogen, so that the pressure indicating device may be utilized as an indicator as well as an automatic relay-operating device.

The small auxiliary fan 35 may be used continuously, in which case the first-described pressure indicating device 19 responding to the main fan 6 would not be necessary, or the auxiliary fan may be used only while the main unit is shut down, the main fan thus being used when the generator is running.

It will be obvious that the measurement of the pressure developed by the small auxiliary fan 35 is a measurement of the pressure-drop in the orifice 39 which consumes substantially all of the energy of the auxiliary fan 35. It will also be obvious that such pressure-measurement is a measurement of the power input or output of the small, constant-speed driving motor 36. When I speak of measuring the pressure developed by the small, constant-speed fan 35, I contemplate any means which substantially accomplish such a result.

It is obvious that any one of the three pressure indicating means above described may be substituted, the one for the other, and that other means for responding to the dynamic or kinetic effectiveness of the fan may be utilized in place of the differential pressure gauges shown in Fig. 1.

Since the pressure at another point of the casing is maintained reasonably constant, as by means of the hydrogen tank described in connection with Fig. 1, the density of the gas as indicated by the pressure developed by the fan is a sufficiently accurate indication of the percent of impurity present in the hydrogen. As an admixture of sufficient air to increase the density of the cooling medium by several hundred percent would be necessary to reach the danger point at which even a slight explosion could occur, it will be seen that there will be no difficulty in successfully guarding against these explosions by the means herein described.

In Fig. 2 is shown another means for responding to excessive densities, comprising a resilient vane 52 mounted on the inside of the casing 2 immediately adjacent to the external periphery of the fan blades 6, so as to be deflected by the impinging stream of the ventilating gas. Excessive velocities of the ventilating gas produce excessive pressures, indicating impure hydrogen. A contact member 53 is provided to close a relay circuit 54—55 at a predetermined flexure of the vane, in order to provide an indication of presence of an abnormal admixture air.

While I have disclosed my invention in several preferred forms, it is obvious that many changes may be made in the execution of my invention. It is desired, therefore, that the disclosed details shall be taken as illustrative only, except in so far as they may be specifically recited in the appended claims.

I claim as my invention:

1. The combination with a vessel containing a relatively light gas under circumstances subjecting the same to the possible infiltration of a relatively heavy gas, of a fan operating at a predetermined speed in said vessel, means for giving an external operation responsive to the dynamic effectiveness of said fan in the ambient gaseous medium, and a separate means disposed adjacent to said vessel for responding to the gas pressure therein.

2. The method of detecting the infiltration of a relatively heavy gas in a vessel normally containing only a relatively light gas and also containing a fan operating at a predetermined speed, comprising obtaining an indication of the dynamic effectiveness of said fan, and obtaining an indication of the gas pressure at another point within said vessel.

3. A hydrogen-cooled dynamo-electric machine including a fan for circulating said hydrogen and means responsive to the dynamic effectiveness of said fan for indicating a dangerously large increase in the density of the gaseous cooling medium.

4. The combination with an electrical apparatus having a closed ventilating system utilizing hydrogen as the ventilating medium, of means responsive to the gas pressure of the hydrogen for admitting hydrogen at one or more points in said ventilating system in such manner as to automatically maintain a substantially constant hydrogen pressure higher than atmosphere, and means responsive to the density of the ventilating medium for discharging the ventilating medium from another point or points in said ventilating system in such manner as to automatically maintain a substantially constant purity of hydrogen in said ventilating system.

5. The method of operating a machine having a closed ventilating system utilizing hydrogen as the ventilating medium, which comprises admitting hydrogen whenever the gaseous pressure in said ventilating system falls below a predetermined pressure higher than atmosphere and discharging the gaseous medium from said ventilating system whenever the gas density exceeds a predetermined amount indicating a predetermined impurity of the hydrogen.

6. The method of detecting the presence of a probable contaminating gas in a vessel normally containing only a gas of substantially different density than said probable contaminating gas, and also containing a fan operating at a predetermined speed, comprising obtaining an indication of the dynamic effectiveness of said fan at one point in said vessel, and maintaining the gas pressure constant within predetermined limits at another point within said vessel.

7. The combination with a machine to be cooled, comprising a substantially hermetically closed containing vessel filled with a mixture composed of substantially pure hydrogen, and aerodynamic means responsive to the density of the hydrogen mixture for initiating steps that will result in an increase in the hydrogen content of the mixture.

8. The combination with a machine to be cooled, comprising a substantially hermetically closed containing vessel filled with a mixture composed of substantially pure hydrogen, means responsive to predetermined pressure limits for controlling the gaseous pressure, and means responsive to the density of the hydrogen mixture for initiating steps that will result in an increase in the hydrogen content of the mixture.

In testimony whereof, I have hereunto subscribed my name this 26th day of April, 1926.

GAYLORD W. PENNEY.